(12) United States Patent
Suryanarayana et al.

(10) Patent No.: US 12,056,010 B2
(45) Date of Patent: Aug. 6, 2024

(54) SYSTEM ON A CHIP-AGNOSTIC DYNAMIC FIRMWARE VOLUMES FOR BASIC INPUT/OUTPUT EXTENSION

(71) Applicant: Dell Products L.P., Round Rock, TX (US)

(72) Inventors: Shekar Babu Suryanarayana, Bangalore (IN); Karunakar Poosapalli, Medak (IN); Gowtham Moorthy, Namakkal (IN); Piyush Dhamdhere, Indore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/677,108

(22) Filed: Feb. 22, 2022

(65) Prior Publication Data

US 2023/0267045 A1 Aug. 24, 2023

(51) Int. Cl.
| | |
|---|---|
| *G06F 11/14* | (2006.01) |
| *G06F 9/4401* | (2018.01) |
| *G06F 11/20* | (2006.01) |

(52) U.S. Cl.
CPC ........ *G06F 11/1417* (2013.01); *G06F 9/4403* (2013.01); *G06F 9/4408* (2013.01); *G06F 11/2025* (2013.01); *G06F 11/2092* (2013.01); *G06F 2201/85* (2013.01)

(58) Field of Classification Search
CPC .. G06F 11/1417; G06F 9/4403; G06F 9/4408; G06F 11/2025; G06F 11/2092; G06F 2201/85

See application file for complete search history.

(56) References Cited

U.S. PATENT DOCUMENTS

| | | | | |
|---|---|---|---|---|
| 2009/0328022 | A1* | 12/2009 | Brogan | ............... G06F 12/0897 |
| | | | | 711/E12.008 |
| 2017/0123927 | A1* | 5/2017 | Su | .......................... G06F 9/4403 |
| 2018/0285126 | A1* | 10/2018 | Ganesan | ............... G06F 9/4401 |
| 2019/0163497 | A1* | 5/2019 | Samuel | ............... G06F 11/1469 |
| 2019/0286436 | A1* | 9/2019 | Liu | .......................... G06F 8/654 |
| 2020/0089572 | A1* | 3/2020 | Bodner | ............... G06F 11/2284 |

FOREIGN PATENT DOCUMENTS

WO WO-2022050938 A1 * 3/2022

\* cited by examiner

*Primary Examiner* — Bryce P Bonzo
*Assistant Examiner* — Michael Xu
(74) *Attorney, Agent, or Firm* — Jackson Walker L.L.P.

(57) ABSTRACT

An information handling system may include a processor and first non-transitory computer-readable media communicatively coupled to the processor and having stored thereon a basic input/output system (BIOS) core comprising BIOS core firmware sufficient to execute features of a BIOS of the information handling system to a particular portion of BIOS execution and an extension agent configured to identify and enumerate a firmware volume of a second non-transitory computer-readable media communicatively coupled to the processor and having stored thereon a BIOS extension comprising BIOS extension firmware for executing completion of BIOS execution from the particular portion of BIOS execution.

21 Claims, 4 Drawing Sheets

SYSTEM ON A CHIP-AGNOSTIC DYNAMIC FIRMWARE VOLUMES FOR BASIC INPUT/OUTPUT EXTENSION

TECHNICAL FIELD

The present disclosure relates in general to information handling systems, and more particularly to methods and systems for implementing system on a chip-agnostic dynamic firmware volumes for basic input/output extension.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A critical component of modern information handling systems is the basic input/output system (BIOS). A BIOS may comprise boot firmware configured to be the first code executed by a processor of an information handling system when the information handling system is booted and/or powered on, and serves to initialize information handling resources of the information handling system and/or initialize interoperation of information handling system with other information handling systems.

Information handling system vendors continue to add features to BIOS firmware, rendering challenges in accommodating such features within the Serial Peripheral Interface (SPI) flash memory in which BIOS code is typically stored. In addition, vendors of processing devices regularly provide security updates to BIOS firmware, further causing challenges in accommodating all features within SPI flash memory.

SUMMARY

In accordance with the teachings of the present disclosure, the disadvantages and problems associated with configuring a network stack during boot may be reduced or eliminated.

In accordance with embodiments of the present disclosure, an information handling system may include a processor and first non-transitory computer-readable media communicatively coupled to the processor and having stored thereon a basic input/output system (BIOS) core comprising BIOS core firmware sufficient to execute features of a BIOS of the information handling system to a particular portion of BIOS execution and an extension agent configured to identify and enumerate a firmware volume of a second non-transitory computer-readable media communicatively coupled to the processor and having stored thereon a BIOS extension comprising BIOS extension firmware for executing completion of BIOS execution from the particular portion of BIOS execution.

In accordance with these and other embodiments of the present disclosure, a method may include, in an information handling system comprising a processor and first non-transitory computer-readable media communicatively coupled to the processor and having stored thereon a basic input/output system (BIOS) core comprising BIOS core firmware sufficient to execute features of a BIOS of the information handling system to a particular portion of BIOS execution identifying and enumerating, with an extension agent embodied on the first non-transitory computer-readable media, a firmware volume of a second non-transitory computer-readable media communicatively coupled to the processor and having stored thereon a BIOS extension comprising BIOS extension firmware for executing completion of BIOS execution from the particular portion of BIOS execution.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising first non-transitory computer-readable media communicatively coupled to the processor and having stored thereon a basic input/output system (BIOS) core comprising BIOS core firmware sufficient to execute features of a BIOS of the information handling system to a particular portion of BIOS execution: identify and enumerate, with an extension agent embodied on the first non-transitory computer-readable media, a firmware volume of a second non-transitory computer-readable media communicatively coupled to the processor and having stored thereon a BIOS extension comprising BIOS extension firmware for executing completion of BIOS execution from the particular portion of BIOS execution.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
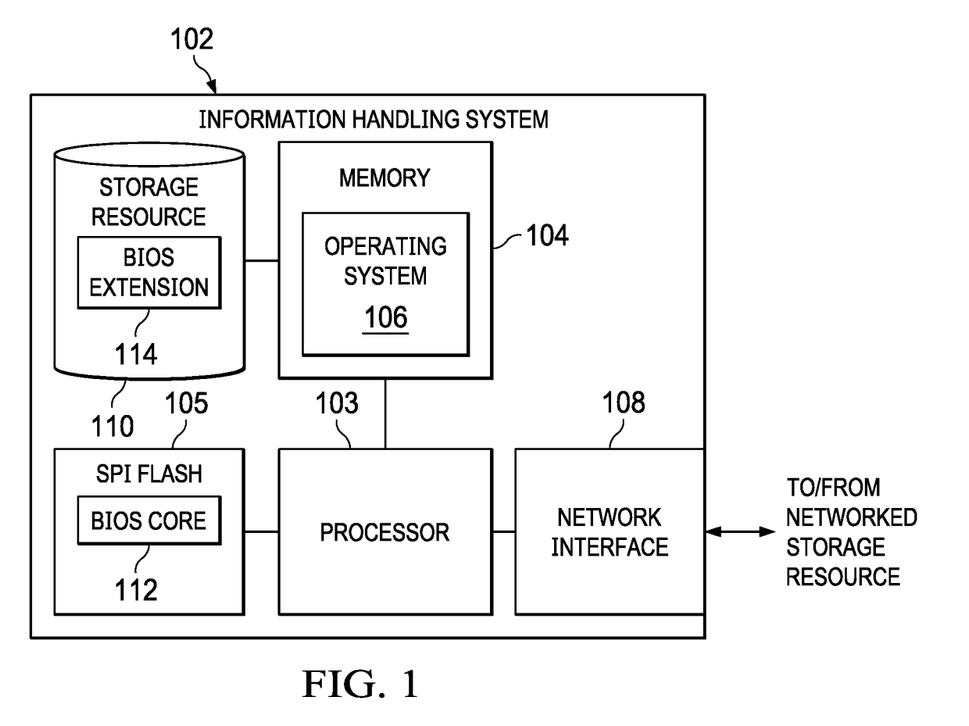
FIG. 1 illustrates a block diagram of an information handling system, in accordance with embodiments of the present disclosure.

FIG. 1 illustrates a block diagram of an example information handling system 102, in accordance with embodiments of the present disclosure. In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, an SPI flash 105 communicatively coupled to processor 103, a network interface 108 communicatively coupled to processor 103, and a storage resource 110 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

SPI flash 105 may include any system, device, or apparatus configured to store BIOS firmware. As shown in FIG. 1, SPI flash 105 may store BIOS core 112. BIOS core 112 may include a core portion of a BIOS of information handling system 102 which may represent at least those BIOS features required to boot through the security (SEC) phase and pre-Extended Firmware Interface Initialization (PEI) phase of BIOS execution. BIOS core 112 is described in greater detail with respect to FIG. 2, below.

As used herein, a BIOS may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, a BIOS may be implemented as a program of instructions that may be read by and executed on processor 103 to carry out the functionality of the BIOS. In these and other embodiments, the BIOS may comprise boot firmware configured to be the first code executed by processor 103 when information handling system 102 is booted and/or powered on. As part of its initialization functionality, code for the BIOS may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. Network interface 108 may be configured to communicate via wire-line transmissions, wireless transmission, or both. Although not explicitly shown in FIG. 1, network interface 108 may be communicatively coupled to one or more networked storage resources A storage resource 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 110 internal to information handling system 102, in some embodiments, storage resource 110 may be external to information handling system 102 (e.g., embodied by a physical array of external hard disk drives).

As shown in FIG. 1, storage resource 110 may have stored thereon BIOS extension 114. BIOS extension 114 may include features of the BIOS of information handling system 102 not otherwise stored within BIOS core 112. For example, BIOS extension 114 may include features of the BIOS that execute at the Driver Execution Environment (DXE) and later stages of the BIOS execution, and may also, in some embodiments, include vendor features to BIOS implemented by a vendor or other provider of information handling system 102. Also, although not explicitly shown in FIG. 1, a BIOS extension 114 may also be stored to one or more networked storage resources coupled with network interface 108.

In addition to processor 103, memory 104, SPI flash 105, network interface 108, and storage resource 110, information handling system 102 may include one or more other information handling resources.

Figure 2:
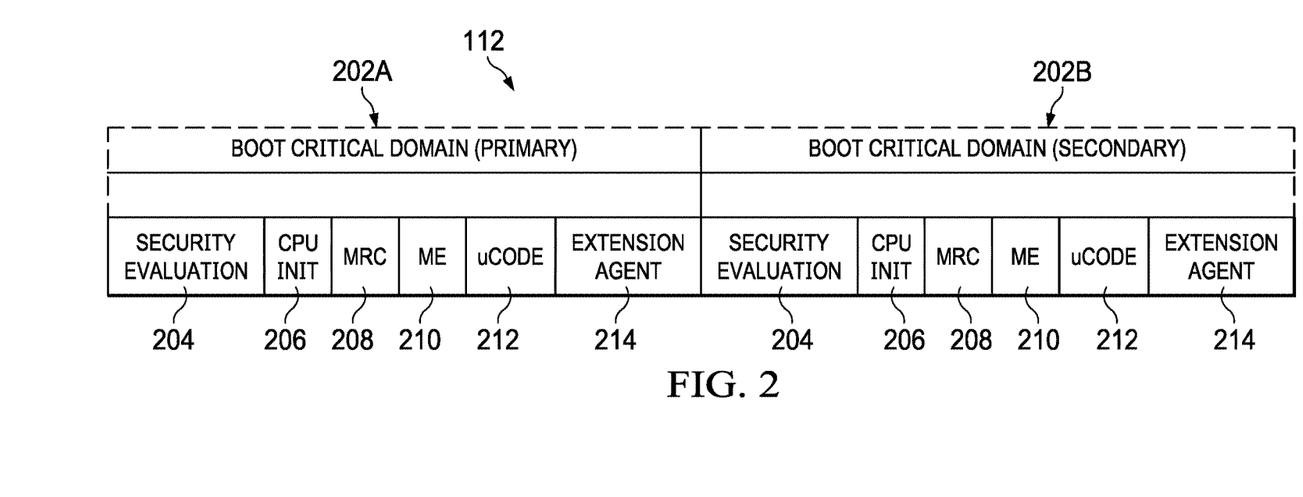
FIG. 2 illustrates a block diagram of BIOS components stored to SPI flash storage of the information handling system shown in FIG. 1, in accordance with embodiments of the present disclosure.

FIG. 2 illustrates a block diagram of BIOS components stored to SPI flash 105, in accordance with embodiments of the present disclosure. As shown in FIG. 2, BIOS core 112 may comprise a primary boot critical domain 202A and a secondary boot critical domain 202B, which may be a redundant copy of the contents of primary boot critical domain 202A, for purposes of failover in the event of a failure occurring in primary boot critical domain 202A. In embodiments in which redundancy failover is not supported, secondary boot critical domain 202B may be absent.

As shown in FIG. 2, each boot critical domain 202 may include security evaluation code 204 (e.g., for implementing the security phase (SEC) of BIOS execution), silicon initialization PEI drivers 206 (shown as "CPU Init" in FIG. 2), memory reference code (MRC) 208, management engine (ME) code 210, microcode 212, and an extension agent 214. Accordingly, a boot critical domain 202 may include executable code for the SEC and PEI phases of BIOS execution, and may include some more-critical DXE features.

Figure 3:
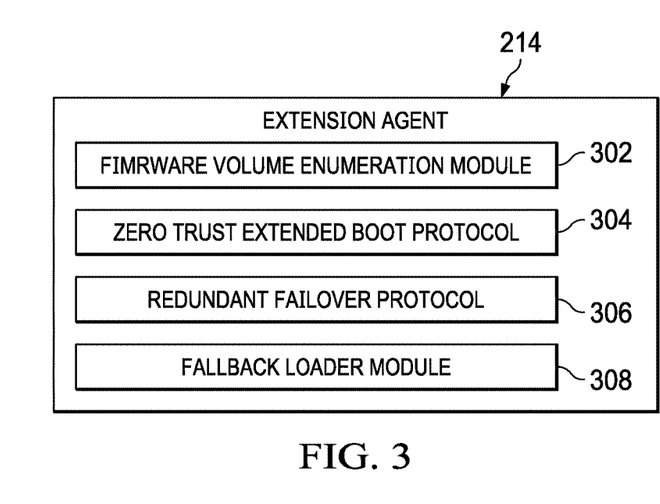
FIG. 3 illustrates a block diagram of selected functional components of the extension agent depicted in FIG. 2, in accordance with embodiments of the present disclosure.

Extension agent 214 may comprise a program of executable code configured to execute during the PEI phase of BIOS, and may be configured to facilitate loading and execution of BIOS extension 114, as well as facilitate redundant failover from primary boot critical domain 202A to secondary boot critical domain 202B when appropriate, as described in greater detail below with respect to FIG. 3. FIG. 3 illustrates a block diagram of selected functional components of extension agent 214, in accordance with embodiments of the present disclosure. As shown in FIG. 3, extension agent 214 may implement a firmware volume enumeration module 302, zero trust extended boot protocol 304, redundant failover protocol 306, and a fallback loader module 308.

Firmware volume enumeration module 302 may be agnostic to a hardware chipset of information handling system 102, and may be configured to dynamically enumerate one or more extended firmware stores (e.g., on storage resource 110 and/or on a networked storage resource coupled via network interface 108) and further configured to continue boot and BIOS execution from such one or more extended firmware stores once the features of BIOS core 112 have executed. To achieve such functionality, firmware volume enumeration module 302 may comprise a virtual block input/output (I/O) driver loaded in a late portion of the PEI phase or early in the DXE phase, and which is integral to a boot critical domain 202. Firmware volume enumeration module 302 may be configured to locate all storage resources accessible to processor 103 (e.g., storage resource 110, networked storage resource coupled via network interface 108) and enumerate firmware volumes comprising BIOS extension 114 partitions in such storage resources. Accordingly, boot critical components may reside in SPI flash 105, but other firmware features (e.g., of DXE phase, of boot device selection (BDS) phase, of vendor-added features, etc.), may be embedded in different firmware volumes spread across one or more storage resources, wherein firmware volume enumeration module 302 may be configured to dynamically locate and dispatch such features as needed.

For example, in some embodiments, only a core portion of the DXE phase including drivers required to load from SPI flash 105 may be stored in SPI flash 105, while an extended portion of the DXE phase and other BIOS components may reside on one or more extended firmware stores. During execution, a DXE dispatcher may load only the required drivers mapped in SPI flash 105, and after the DXE core and associated drivers have loaded from SPI flash 105, then the DXE dispatcher may give control to firmware volume enumeration module 302, which may enumerate storage resources accessible to processor 103 (e.g., storage resource 110, networked storage resource coupled via network interface 108) that include BIOS extension 114, allowing remaining DXE drivers to be loaded from BIOS extension 114. Zero trust extended boot protocol 304 may be configured to identify trusted firmware volumes from one or more storage resources accessible to processor 103 and securely boot from such one or more trusted firmware volumes. For example, for storage resources local to information handling system 102 (e.g., storage resource 110), zero trust extended boot protocol 304 may verify trusted signatures of firmware volumes and a signature of a DXE dispatcher module before loading any executable firmware modules from the firmware volumes. As another example, for networked storage coupled via network interface 108, zero trust extended boot protocol 304 may execute a system management bus (SMB) client protocol to communicate a firmware volume access request to the networked storage resource followed by a secure identification of the SMB network share and SMB server itself. Each networked firmware volume may internally store the trusted signature and the SMB secure blob which may be extended over SMB compounded commands to evaluate trust before any networked firmware is loaded. Zero trust extended boot protocol 304 may further update extended firmware (e.g., BIOS extension 114) on a zero trust evaluation to ensure only a signed firmware capsule is enabled to update an extended firmware image during runtime of operating system 106.

Redundant failover protocol 306 may be configured to dynamically failover to secondary boot critical domain 202B in the event of a failure (e.g., failure to complete power-on/self-test) in booting from primary boot critical domain 202A (e.g., due to corruption of firmware code in primary boot critical domain 202A). The ability to house both boot critical domains 202 in order to provide redundancy may be enabled by the storage of BIOS features in BIOS extension 114 (or similar portion of a networked storage resource), rather than in SPI flash 105, as is traditionally done.

Fallback loader module 308 may be configured to dynamically switch across firmware volumes stored on storage resources accessible to processor 103 to find a non-corrupted and stable firmware store from which to boot BIOS features. Thus, all features of BIOS firmware may be booted from extended firmware stores, and fallback loader module 308 may be configured to rank available firmware volumes as options for executing extended firmware features (e.g., extended BIOS features may first be attempted from BIOS extension 114 on storage resource 110, falling back to a firmware volume on a networked storage resource if BIOS extension 114 is corrupted).

Figure 4:
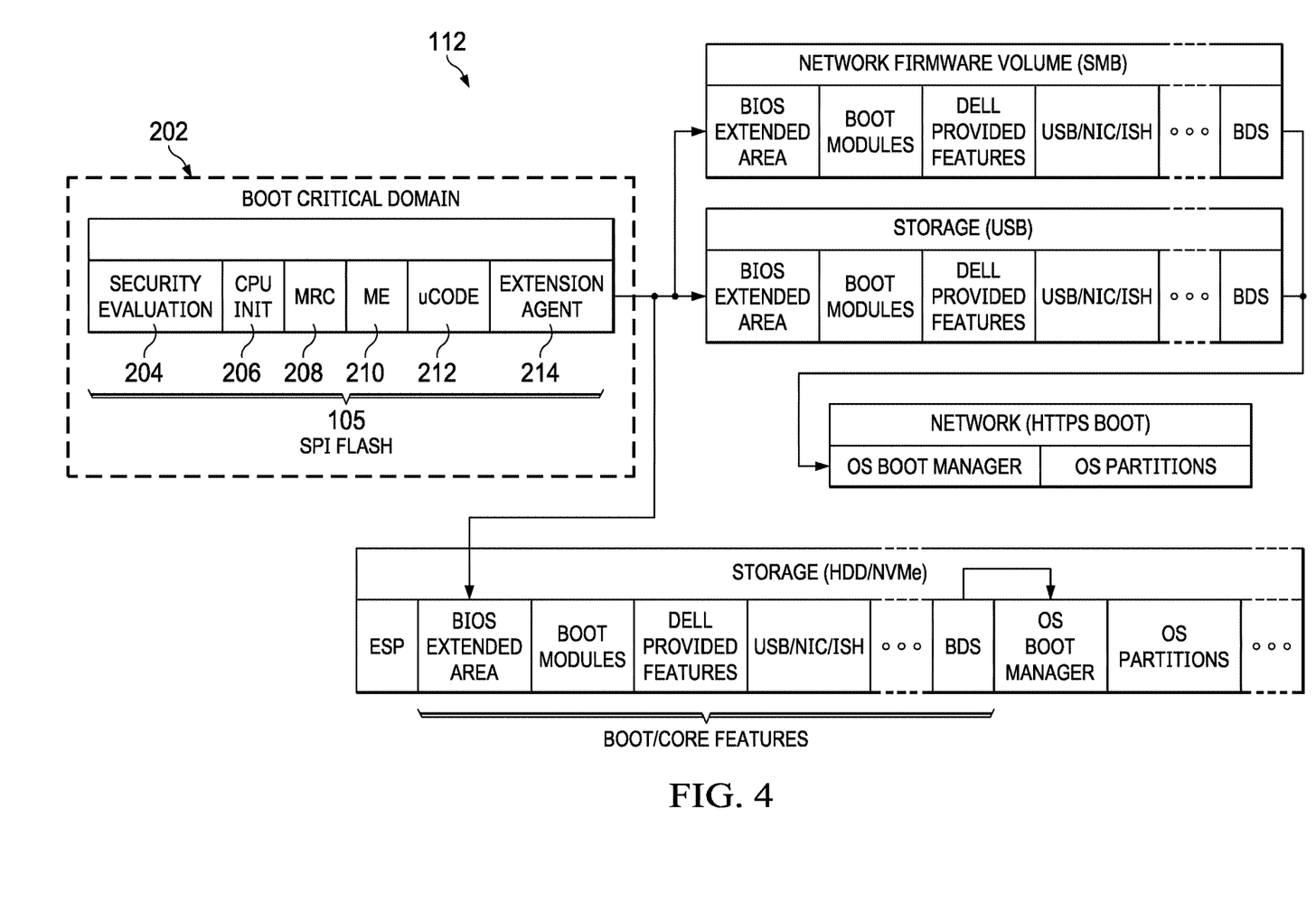
FIG. 4 illustrates a dynamic firmware volume architecture, in accordance with embodiments of the present disclosure.

In operation, fallback loader module 308 may load in the late PEI phase and create a hand-off block (HOB) list (e.g., a list of data passed from the PEI phase to the DXE phase for follow-up actions to be completed in the DXE phase) to enumerate (e.g., via BIOS extension 114 from storage resource 110 and/or networked storage). The store selected by fallback loader module 308 may be based on detection of an authorized extended BIOS store which is valid and non-corrupted, and fallback loader module 308 may (e.g., via firmware volume enumeration module 302) trigger a DXE dispatcher from the extended BIOS store. Accordingly, all core features of BIOS can be booted from the extended BIOS store, with operating system boot determined in the Boot Device Selection (BDS) phase of BIOS execution as usual. FIG. 4 illustrates an example dynamic firmware volume architecture, in accordance with embodiments of the present disclosure, depicting BIOS core 112 and features of extended BIOS stores stored to a network firmware volume, USB storage, and a hard disk drive.

Figure 5:
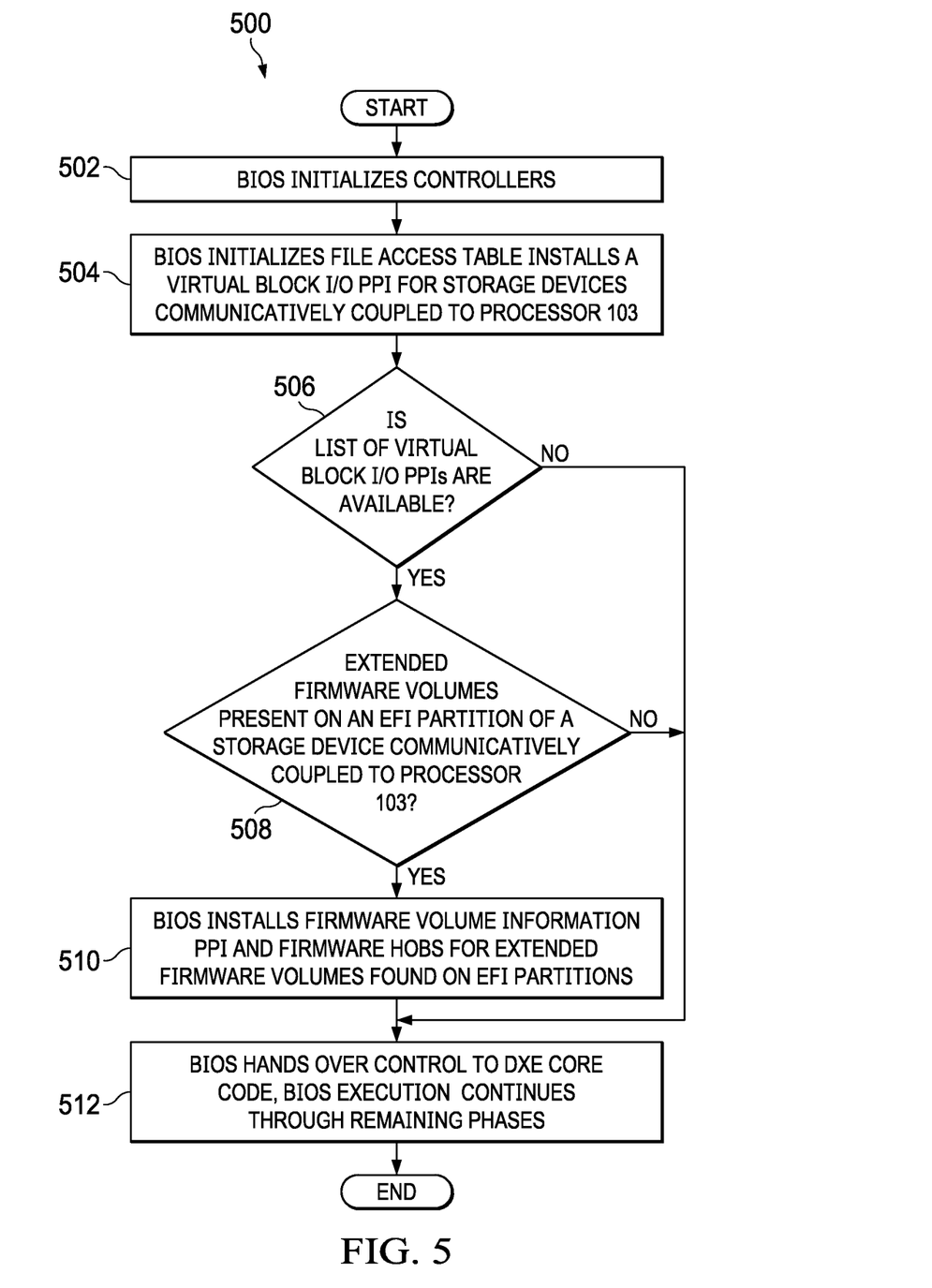
FIG. 5 illustrates a flow chart of an example method for enabling the functionality of an extension agent, in accordance with embodiments of the present disclosure.

FIG. 5 illustrates a flow chart of an example method 500 for enabling the functionality of extension agent 214, in accordance with embodiments of the present disclosure. According to one embodiment, method 500 may begin at step 502. As noted above, teachings of the present disclosure may be implemented in a variety of configurations of information handling system 102.

Method 500 may execute during a PEI phase of BIOS execution.

At step 502, BIOS may initialize relevant controllers, including without limitation Advanced Host Controller Interface controllers, Extensible Host Controller Interface controllers, and Non-Volatile Memory Express controllers. At step 504, BIOS may initialize a file access table for the PEI phase and install a virtual block I/O programmable peripheral interface (PPI) for storage devices communicatively coupled to processor 103.

At step 506, BIOS may determine if a list of virtual block I/O PPIs are available. If so, method 500 may proceed to step 508. Otherwise, method 500 may proceed to step 512.

At step 508, BIOS may check for extended firmware volumes on an EFI partition of a storage device communicatively coupled to processor 103. If an extended firmware volume on an EFI partition of a storage device is available, method 500 may proceed to step 510. Otherwise, method 500 may proceed to step 512.

At step 510, BIOS may install a firmware volume information PPI and firmware HOBs for extended firmware volumes found on any EFI partition.

At step 512, BIOS may hand over control to DXE core code, and BIOS execution may continue, using extended BIOS code present on a storage device communicatively coupled to processor 103, if present and available.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Method 500 may be implemented using information handling system 102 or any other system operable to implement method 500. In certain embodiments, method 500 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:
a processor; and
first non-transitory computer-readable media communicatively coupled to the processor and having stored thereon a basic input/output system (BIOS) core comprising:
BIOS core firmware sufficient to execute features of a BIOS of the information handling system to a particular portion of BIOS execution; and
an extension agent configured to identify accessible storage resources, comprising all storage resources accessible to the processor, and enumerate firmware volumes with BIOS extension partitions in any of the accessible storage resources, said firmware volumes including a firmware volume of a second non-transitory computer-readable media communicatively coupled to the processor and having stored thereon a BIOS extension comprising BIOS extension firmware for executing completion of BIOS execution from the particular portion of BIOS execution, wherein the particular portion of BIOS execution comprises a portion required to boot through a security (SEC) phase and a pre-Extended Firmware Interface Initialization (PEI) phase of the BIOS execution.

2. The information handling system of claim 1, wherein the second non-transitory computer-readable media comprises a storage resource local to the information handling system.

3. The information handling system of claim 1, wherein the second non-transitory computer-readable media comprises a storage resource communicatively coupled to the information handling system via a network interface of the information handling system.

4. The information handling system of claim 1, wherein the extension agent is further configured to verify that the firmware volume of the second non-transitory computer-readable media is trusted.

5. The information handling system of claim 1, wherein:
the BIOS core firmware comprises a primary boot critical domain and a secondary boot critical domain; and
the extension agent is further configured to dynamically failover to the secondary boot critical domain in the event of a failure in booting the BIOS core from the primary boot critical domain.

6. The information handling system of claim 1, wherein the extension agent is further configured to:
identify and enumerate a second firmware volume of the second non-transitory computer-readable media or third non-transitory computer-readable media communicatively coupled to the processor, the second firmware volume having stored thereon a second BIOS extension comprising BIOS extension firmware for executing completion of BIOS execution from the particular portion of BIOS execution; and
dynamically select one of the firmware volume and the second firmware volume for execution from the particular portion of BIOS execution to ensure completion of a boot of the information handling system with non-corrupted firmware.

7. The information handling system of claim 1, wherein the first non-transitory computer-readable media is integrated in a Serial Peripheral Interface flash storage device.

8. A method comprising, in an information handling system comprising a processor and first non-transitory computer-readable media communicatively coupled to the processor and having stored thereon a basic input/output system (BIOS) core comprising BIOS core firmware sufficient to execute features of a BIOS of the information handling system to a particular portion of BIOS execution:
with an extension agent embodied on the first non-transitory computer-readable media identifying accessible storage resources, comprising all storage resources accessible to the processor, and enumerating a firmware volume of a second non-transitory computer-readable media communicatively coupled to the processor and having stored thereon a BIOS extension comprising BIOS extension firmware for executing completion of BIOS execution from the particular portion of BIOS execution, wherein the particular portion of BIOS execution comprises a portion required to boot through a security (SEC) phase and a pre-Extended Firmware Interface Initialization (PEI) phase of the BIOS execution.

9. The method of claim 8, wherein the second non-transitory computer-readable media comprises a storage resource local to the information handling system.

10. The method of claim 8, wherein the second non-transitory computer-readable media comprises a storage resource communicatively coupled to the information handling system via a network interface of the information handling system.

11. The method of claim 8, further comprising verifying, by the extension agent, that the firmware volume of the second non-transitory computer-readable media is trusted.

12. The method of claim 8, wherein:
the BIOS core firmware comprises a primary boot critical domain and a secondary boot critical domain; and
the method further comprises dynamically failing over, by the extension agent, to the secondary boot critical domain in the event of a failure in booting the BIOS core from the primary boot critical domain.

13. The method of claim 8, further comprising by the extension agent:
identifying and enumerating a second firmware volume of the second non-transitory computer-readable media or third non-transitory computer-readable media communicatively coupled to the processor, the second firmware volume having stored thereon a second BIOS extension comprising BIOS extension firmware for executing completion of BIOS execution from the particular portion of BIOS execution; and
dynamically selecting one of the firmware volume and the second firmware volume for execution from the particular portion of BIOS execution to ensure completion of a boot of the information handling system with non-corrupted firmware.

14. The method of claim 8, wherein the first non-transitory computer-readable media is integrated in a Serial Peripheral Interface flash storage device.

15. An article of manufacture comprising:
a non-transitory computer-readable medium; and
computer-executable instructions carried on the computer-readable medium, the instructions readable by a processor, the instructions, when read and executed, for causing the processor to, in an information handling system comprising first non-transitory computer-readable media communicatively coupled to the processor and having stored thereon a basic input/output system (BIOS) core comprising BIOS core firmware sufficient to execute features of a BIOS of the information handling system to a particular portion of BIOS execution:
with an extension agent embodied on the first non-transitory computer-readable media, identify accessible storage resources, comprising all storage resources accessible to the processor, and enumerate, firmware volumes with BIOS extension partitions in any of the accessible storage resources, said firmware volumes including a firmware volume of a second non-transitory computer-readable media communicatively coupled to the processor and having stored thereon a BIOS extension comprising BIOS extension firmware for executing completion of BIOS execution from the particular portion of BIOS execution, wherein the particular portion of BIOS execution comprises a portion required to boot through a security (SEC) phase and a pre-Extended Firmware Interface Initialization (PEI) phase of the BIOS execution.

16. The article of claim 15, wherein the second non-transitory computer-readable media comprises a storage resource local to the information handling system.

17. The article of claim 15, wherein the second non-transitory computer-readable media comprises a storage resource communicatively coupled to the information handling system via a network interface of the information handling system.

18. The article of claim 15, the instructions for further causing the processor to verify, by the extension agent, that the firmware volume of the second non-transitory computer-readable media is trusted.

19. The article of claim 15, wherein:
the BIOS core firmware comprises a primary boot critical domain and a secondary boot critical domain; and
the instructions for further causing the processor to dynamically failover, by the extension agent, to the secondary boot critical domain in the event of a failure in booting the BIOS core from the primary boot critical domain.

20. The article of claim 15, the instructions for further causing the processor to, by the extension agent:
identify and enumerate a second firmware volume of the second non-transitory computer-readable media or third non-transitory computer-readable media communicatively coupled to the processor, the second firmware volume having stored thereon a second BIOS extension comprising BIOS extension firmware for executing completion of BIOS execution from the particular portion of BIOS execution; and
dynamically select one of the firmware volume and the second firmware volume for execution from the particular portion of BIOS execution to ensure completion of a boot of the information handling system with non-corrupted firmware.

21. The article of claim 15, wherein the first non-transitory computer-readable media is integrated in a Serial Peripheral Interface flash storage device.

* * * * *